United States Patent
Choi et al.

(10) Patent No.: US 8,661,013 B2
(45) Date of Patent: Feb. 25, 2014

(54) METHOD AND APPARATUS FOR GENERATING AND PROVIDING RELEVANT INFORMATION RELATED TO MULTIMEDIA CONTENT

(75) Inventors: Il-hwan Choi, Suwon-si (KR); Seok-hyun Yoon, Seoul (KR); Hyun-sik Yoon, Seoul (KR); Won-ho Ryu, Seoul (KR); Hee-seon Park, Seoul (KR); Sung-ho Ryu, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 413 days.

(21) Appl. No.: 12/320,744

(22) Filed: Feb. 3, 2009

(65) Prior Publication Data

US 2010/0036812 A1   Feb. 11, 2010

(30) Foreign Application Priority Data

Aug. 6, 2008   (KR) .................. 10-2008-0076748

(51) Int. Cl.
*G06F 17/30*   (2006.01)

(52) U.S. Cl.
USPC .......................... 707/706; 707/783; 709/201

(58) Field of Classification Search
USPC .................... 707/706, 783; 709/201
See application file for complete search history.

(56) References Cited

U.S. PATENT DOCUMENTS

| | | |
|---|---|---|
| 2005/0193408 A1 | 9/2005 | Sull et al. |
| 2007/0078904 A1* | 4/2007 | Yoon et al. ............... 707/200 |
| 2008/0177708 A1* | 7/2008 | Ayyar et al. ............... 707/3 |
| 2008/0282297 A1 | 11/2008 | Park |

FOREIGN PATENT DOCUMENTS

| | | |
|---|---|---|
| KR | 10-2007-0035327 A | 3/2007 |
| KR | 10-2007-0101826 A | 10/2007 |

* cited by examiner

*Primary Examiner* — Huawen Peng
(74) *Attorney, Agent, or Firm* — Staas & Halsey LLP (57) ABSTRACT

A method of generating relevant information related to multimedia content at a client that reproduces the multimedia content includes accessing a blog service connected to the client, selecting the first content of the multimedia content, for which relevant information is to be generated, by using the blog service, generating the relevant information using a template according to the type of the relevant information generated with respect to the first content, and transmitting the generated relevant information to a server.

18 Claims, 8 Drawing Sheets

METHOD AND APPARATUS FOR GENERATING AND PROVIDING RELEVANT INFORMATION RELATED TO MULTIMEDIA CONTENT

CROSS-REFERENCE TO RELATED APPLICATIONS

This application claims the benefit of Korean Patent Application No. 10-2008-0076748, filed on Aug. 6, 2008, in the Korean Intellectual Property Office, the disclosure of which is incorporated herein in its entirety by reference.

BACKGROUND

1. Field

The present invention relates to a method and apparatus for generating and providing information related to multimedia content such as motion pictures.

2. Description of the Related Art

Recently, digital broadcasting such as digital television (DTV), digital multimedia broadcasting (DMB), digital video broadcasting-handheld (DVB-H), MediaFLO™, digital cable, satellite broadcasting, and internet protocol television (IPTV) has become gradually more popular. Digital broadcasting provides a totally new environment that is different from a broadcasting environment provided through conventional analog televisions. For example, digital broadcasting provides high quality content at an HD (high definition) level that is 6 to 7 times higher than the conventional analog televisions. The development of compression technology such as MPEG-2/4 enables multichannel broadcast. Also, a variety of additional services such as bidirectional data broadcasting may be provided through digital broadcasting.

Digital broadcasting is able to provide various additional services beyond content such as motion picture. For example, life information service such as news and weather, bidirectional service such as shopping, games, stocks, banking, and video-on-demand (VOD), or relevant information service such as products, film locations, and background music related to content can be provided by digital broadcasting.

Digital broadcasting uses an advanced television systems committee (ATSC) standard for a ground wave type, an open cable application platform (OCAP) standard for a cable type, a DVB standard for a satellite broadcasting type, and a digital audio broadcasting (DAB) standard of Europe for a DMB type. There are three international data standards: (1) the OCAP, (2) an advanced common application platform (ACAP), and (3) a multimedia home platform (MHP). In Korea, the OCAP standard is used for the cable data broadcasting, the ACAP standard is used for the ground wave data broadcasting, and a DVB-MHP standard is used for the satellite broadcasting. Also, the DMB uses a Korean T-DMB standard based on the European DAB. The data broadcasting uses MPEG-4 binary format for scenes (BIFS), dynamic label segment (DLS), and broadcasting web site (BWS) standards.

Figure 1:
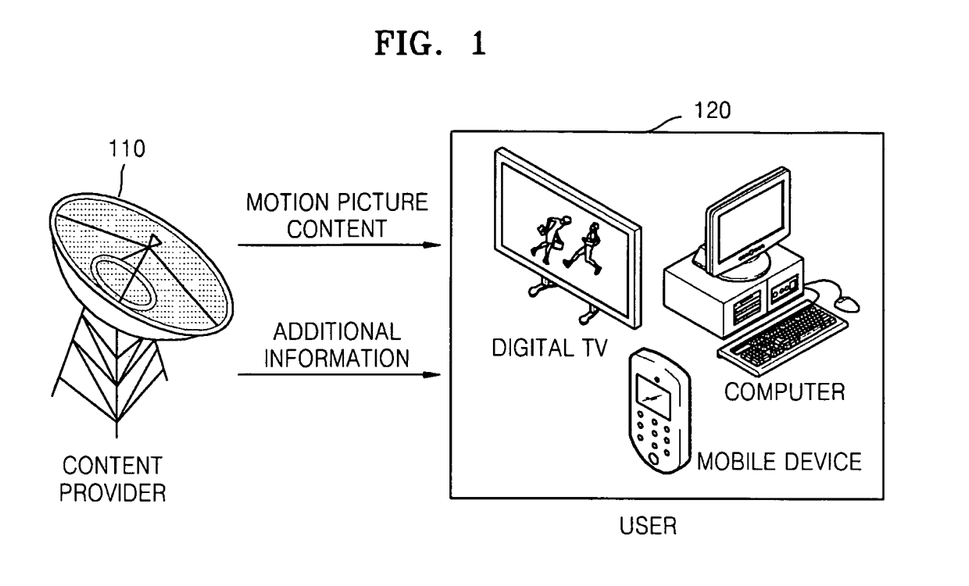
FIG. 1 illustrates a system in which a content provider of digital broadcasting provides additional services according to a conventional technology.

FIG. 1 illustrates a system in which a content provider of digital broadcasting provides additional services according to a conventional technology. Referring to FIG. 1, a content provider (CP) 110 provides content to a user 120 using a service. Most of the content providers 110 are typically broadcasting companies having a large amount of funds and an infra system while the user 120 may be unspecified individuals. The user 120 could utilize the provided service by using all sorts of digital processing devices capable of consuming provided content, such as digital TVs, mobile devices, and personal computers.

In a typical broadcasting method, under a digital broadcasting environment, a content delivered to the user 120 includes information in addition to multimedia content itself such as motion picture. That is, the content provider 110 provides additional information in addition to motion picture content. But in this case, the additional information services delivered by the content provider 110 of digital broadcasting is insufficient to satisfy various demands of different users 120.

SUMMARY

To solve the above and/or other problems, the present invention provides a method and apparatus for generating and providing information related to multimedia content, such as motion pictures, at a client's end.

According to an aspect of the present invention, a method of generating relevant information related to multimedia content at a client that reproduces the multimedia content comprises accessing a blog service connected to the client via a network such as the Internet, selecting first content of the multimedia content, for which relevant information is to be generated, by using the blog service, generating the relevant information using a template according to a type of the relevant information generated with respect to the first content, and transmitting the generated relevant information to a server.

The generating of the relevant information may include determining whether the generated relevant information is related to a content reproduced at a predetermined position in an overall section of the first content.

The generating of the relevant information may further include determining whether bookmark information storing the position exists when the relevant information is related to the content reproduced at a predetermined position in an overall section of the first content.

The generating of the relevant information may further include selecting a position in the overall section of the first content where the generated relevant information is located, when the bookmark information does not exist.

The generating of the relevant information may further include setting the right of access in which the generated relevant information is searched for later by other clients.

The accessing the blog service may be performed during the reproduction of the multimedia content.

According to another aspect of the present invention, a method of providing relevant information related to a multimedia content at a client that reproduces the multimedia content includes requesting the relevant information related to the multimedia content that is reproduced, from a server, by using a blog service connected to the client via a network such as the Internet, obtaining the relevant information from the server, and displaying the obtained relevant information on a screen.

The requesting of the relevant information may include transmitting an identifier of a program corresponding to the requested multimedia content to the server.

The obtaining of the relevant information may include determining whether relevant information related to a content reproduced at a current position exists in the multimedia content.

The method may further include searching for the relevant information when the relevant information related to a content reproduced at a current position exists, and searching for relevant information of a program corresponding to the transmitted identifier when the relevant information related to a content reproduced at a current position does not exist.

The displaying of the obtained relevant information on a screen may include determining which information is to be displayed based on the accessibility of the information.

The method may further include obtaining a client list according to the determined accessibility of the relevant information, wherein, in the displaying of the obtained relevant information on a screen, only the relevant information created by the client belonging to the obtained list is displayed.

According to another aspect of the present invention, an apparatus for generating relevant information related to multimedia content at a client that reproduces the multimedia content includes a blog accessing unit accessing a blog service connected to the client via a network such as the Internet, a content searching unit selecting first content of the multimedia content, for which relevant information is generated, by using the blog service, a relevant information management unit generating the relevant information using a template according to the type of the relevant information generated with respect to the first content, and a transmission unit transmitting the generated relevant information to a server.

The relevant information management unit may include a scene searching unit determining whether the generated relevant information is related to a content that is reproduced at a predetermined position in an overall section of the first content.

The relevant information management unit may further include a bookmark management unit determining whether bookmark information storing the position exists when the relevant information is related to the content reproduced at a predetermined position in an overall section of the first content.

The relevant information management unit may include the right of access setting unit setting the right of access in which the generated relevant information is searched for later by other clients.

According to another aspect of the present invention, an apparatus for providing relevant information related to multimedia content at a client that reproduces the multimedia content includes a relevant information request unit requesting the relevant information related to the multimedia content that is reproduced, from a server, by using a blog service connected to the client via a network such as the Internet, a relevant information receiving unit obtaining the relevant information from the server, and an output unit displaying the obtained relevant information on a screen.

The relevant information receiving unit may receive relevant information when the relevant information related to a content reproduced at a current position exists in the multimedia content, and receives relevant information of a program corresponding to an identifier of the multimedia content when the relevant information related to a content reproduced at a current position does not exist.

The output unit may include a right of access determination unit determining a range of clients who create the relevant information to be displayed among the all of clients creating the obtained relevant information, and relevant information created by a client belonging to a list according to the determined client range.

According to another aspect of the present invention, a relevant information generation system includes a client reproducing a multimedia content and generating relevant information related to the multimedia content by accessing a blog service connected via Internet, and a data server storing data of the multimedia content and a relevant information server storing the generated relevant information.

According to another aspect of the present invention, a relevant information providing system includes a client requesting relevant information related to a multimedia content using a blog service connected via a network such as the Internet during the reproduction of the multimedia content, and a data server storing data of the multimedia content and a relevant information server providing the requested relevant information to the client.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF EMBODIMENTS

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. Like reference numerals in the drawings denote like elements.

As subjects for generating content expand from professional companies to general users under digital broadcasting environment, for example, user created content (UCC), subjects for generating additional information will gradually expand to general users. A method according to an embodiment of the present invention systematically solves problems of generating and providing such additional information.

Figure 2:
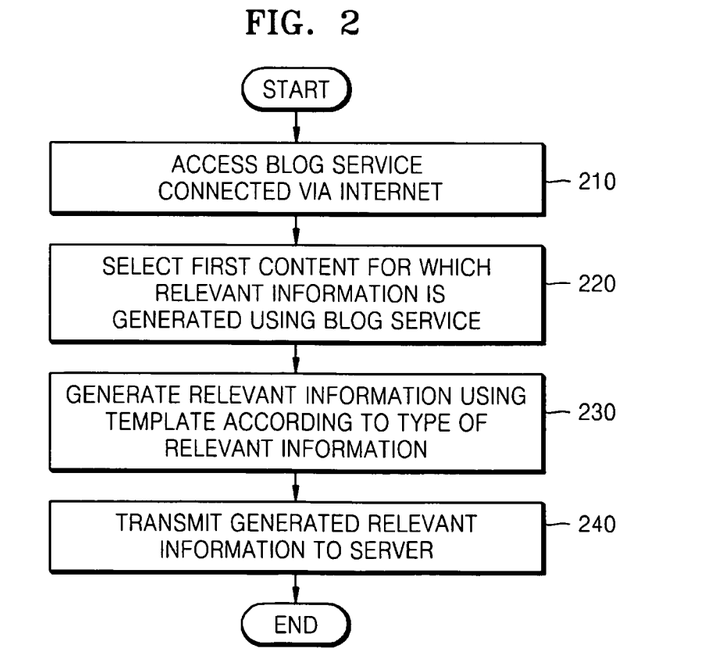
FIG. 2 is a flow chart for explaining a method of generating relevant information related to multimedia content according to an embodiment.

FIG. 2 is a flow chart of a method of generating relevant information related to multimedia content according to an embodiment. Referring to FIG. 2, a method of generating relevant information includes accessing a blog service connected to a client to reproduce multimedia content via a network such as the Internet (Operation 210), selecting first content of the multimedia content, for which relevant information is to be generated, using the blog service (Operation 220), generating the relevant information using a template according to the type of the relevant information that is generated with respect to the first content (Operation 230), and transmitting the generated relevant information to a server (Operation 240).

When a motion picture is reproduced or a program is broadcase, for example, each of users having various interests may desire different relevant information related to a particular scene of the reproduced motion picture or the broadcasted program. Accordingly, in this situation, just waiting until the various relevant information can be obtained from a content provider is not recommended. Instead, establishing a system so that the relevant information can be directly generated at the client's end where the motion picture is reproduced is recommended. That is, in a Web 2.0 Internet environment using collective intelligence, the relevant information generation method of the present embodiment and, also, can generate more information than that provided by content providers and, also, generate "open-type information" capable of bidirectional information communications among users shown in FIG. 2.

The operation method of generating relevant information according to another embodiment is described below.

Figure 3:
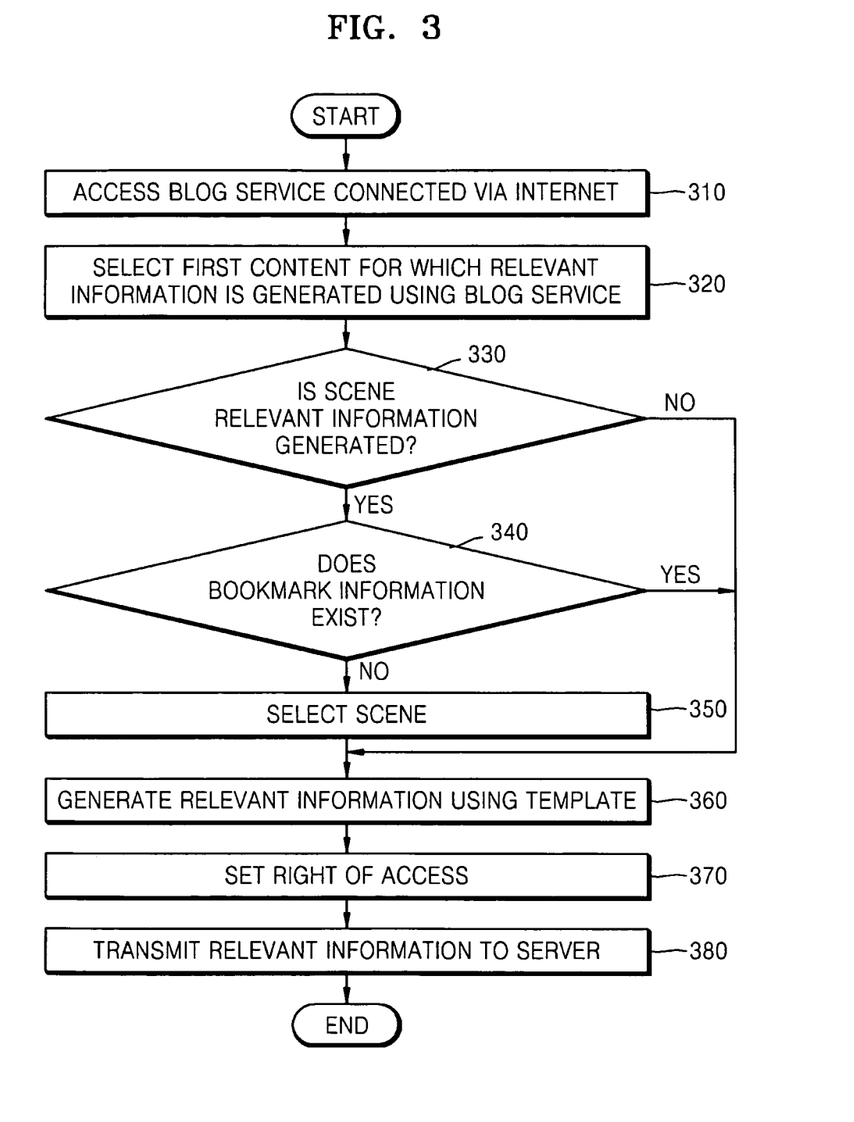
FIG. 3 is a flow chart for explaining a method of generating relevant information related to multimedia content according to another embodiment.

FIG. 3 is a flow chart of a method of generating relevant information related to multimedia content according to another embodiment of the present invention.

Referring to FIG. 3, the method of generating relevant information according to the present embodiment includes accessing a blog service connected, via a network such as the Internet, to the client that reproduces multimedia content (Operation 310), selecting a first content of the multimedia content, for which relevant information is to be generated, using the blog service (Operation 320), determining whether the relevant information to be generated is the information related to the particular position in the overall section of the first content (Operation 330), determining whether there is bookmark information storing the position when the relevant information is related to the particular position in the overall section of the first content (Operation 340), selecting the particular position to which the generated relevant information is related when no bookmark information exists (Operation 350), generating the relevant information using a template according to the type of the relevant information (Operation 360), setting the right of access as to whether the generated relevant information may be searched from other clients (Operation 370), and transmitting the generated relevant information to the server (Operation 380). It is noted that the blog service may accessed using a wired network, or a wireless network, but is not limited thereto.

The multimedia content may include a motion picture file, an audio file, or an image file, or any combination thereof. In the reproduction of motion picture content, for example, when relevant information is created at the client's end where the motion picture content are reproduced, an operation of user login is performed by accessing an Internet blog service in Operation 310.

Next, motion picture content corresponding to the relevant information to be generated is selected. For example, when the motion picture content is a broadcasting service, a particular program such as news, dramas (soap opera) or an entertainment program may be selected in Operation 320.

When a program is selected in the above operation, it is determined whether relevant information related to a particular scene in the program is created or relevant information about the program itself regardless of the particular scene in the program is created in Operation 330.

When the relevant information corresponding to a particular scene is to be created, it is determined whether there is bookmark information of the scene where the relevant information may be positioned, in Operation 340. That is, for a scene at a position bookmarked during watching a program, relevant information may be created after the program watching is completed. When no bookmark exists, the scene may be selected by searching for the position of the scene in the program in Operation 350.

The generated relevant information includes relevant information related to a scene and relevant information related to a program. The relevant information may be generated using a template according to the type of the relevant information in Operation 360. The relevant information may include a place, a person, a product, news, a review, music, or a motion picture file related to a program or a particular scene, which will be described below with reference to a relevant information generation screen shown in FIG. 4.

Figure 4:
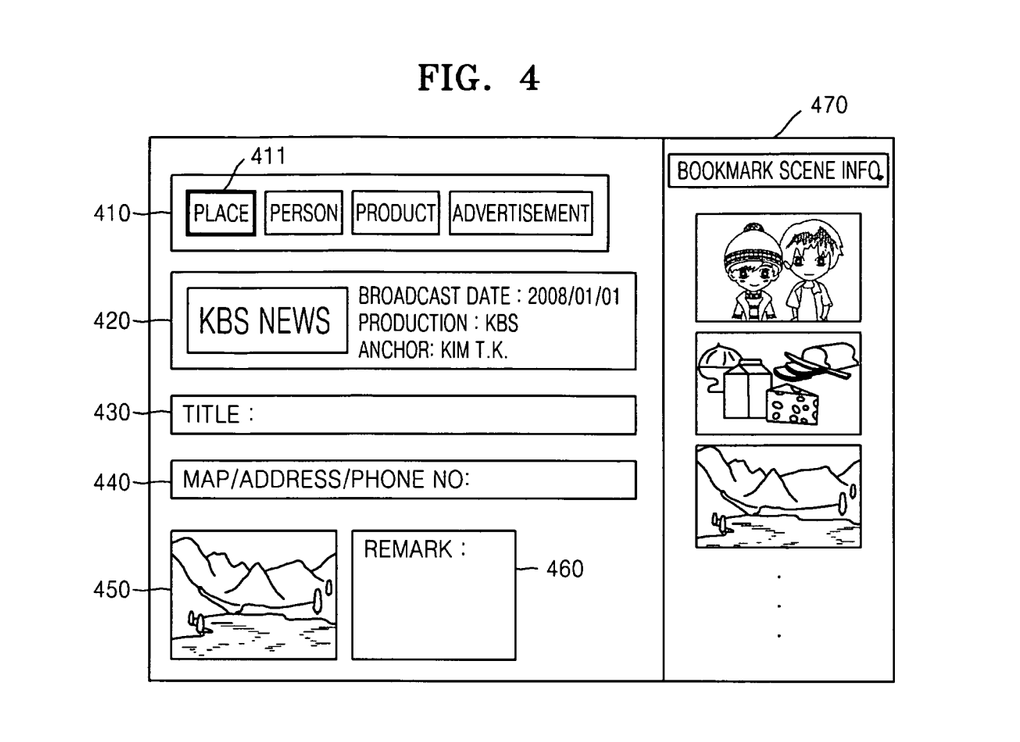
FIG. 4 illustrates the configuration of a relevant information generation screen using a template according to another embodiment.

FIG. 4 illustrates a configuration of the relevant information generation screen using a template according to another embodiment of the present invention. Referring to FIG. 4, the type of relevant information to be created may be a place, a person, a product, or an advertisement in a type section 410. An exemplary screen of a template for creating relevant information about a place 411 is shown in FIG. 4.

The selected program is a "KBS News" program 420 and relevant information related to a particular scene in the program is created. The particular scene may be found in a bookmark scene information section 470 at the right side. When the scene is not bookmarked, an interface for directly searching for the scene may be provided. A corresponding scene 450 is selected in FIG. 4 and additional information about a place related to the corresponding scene 450 is created. Thus, a map/address/telephone section 440 may be included in addition to a basic title section 430. Other comments are written in a remark section 460.

Referring back to FIG. 3, the right of access indicating whether the created relevant information may be searched for by other users later in Operation 370. The generated relevant information is transmitted to the server in Operation 380. The server is a common server capable of bidirectional communications with other users and provides the relevant information to the users at the request of the users.

In the above-described embodiment, the user may create relevant information about a corresponding scene by searching for bookmark information after a program is completed, and also may create relevant information related to a desired scene when the desired scene appears during the program watching.

Figure 5:
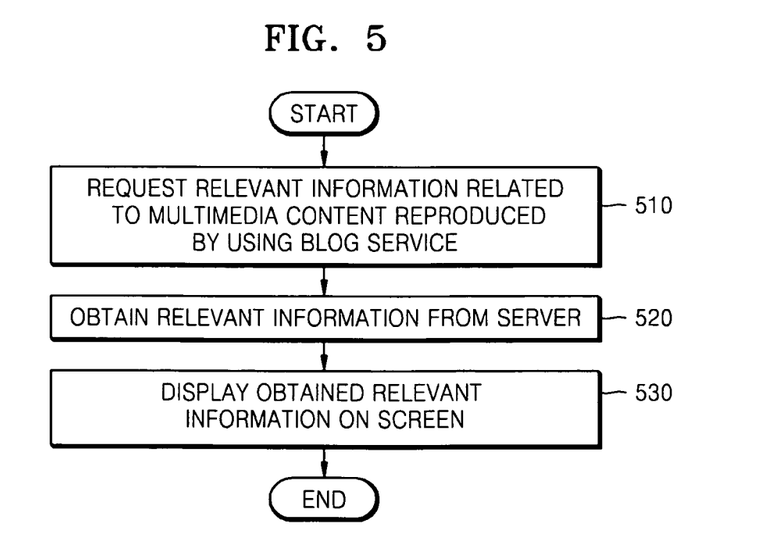
FIG. 5 is a flow chart for explaining a method of providing relevant information related to multimedia content according to another embodiment.

FIG. 5 is a flow chart of a method of providing relevant information related to a multimedia content according to another embodiment. Referring to FIG. 5, the method of providing relevant information related to a multimedia content according to an embodiment includes requesting relevant information related to the multimedia content that is reproduced by the client, using a blog service connected to the client (via Internet) (Operation 510), obtaining the relevant information from the server (Operation 520), and displaying the obtained relevant information on a screen (Operation 530).

Figure 6:
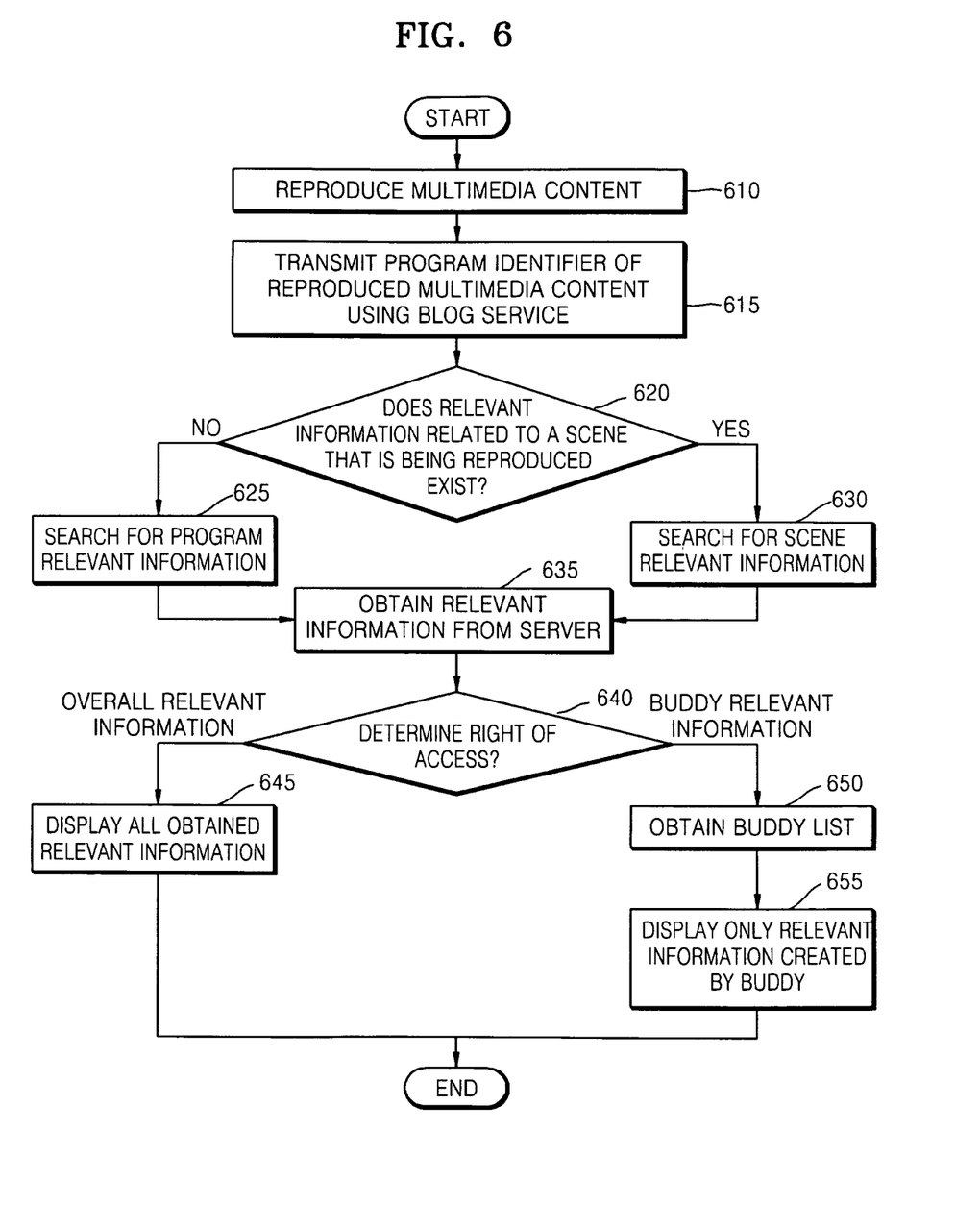
FIG. 6 is a flow chart for explaining a method of providing relevant information related to multimedia content according to another embodiment.

FIG. 6 is a flow chart of a method of providing relevant information related to a multimedia content according to another embodiment. Referring to FIG. 6, when a multimedia content such as a motion picture content is reproduced (Operation 610), if a user wants to see relevant information related to a reproduced scene or program, an identifier of the reproduced program is sent to the server to request the relevant information from the server (Operation 615).

It is determined whether there is relevant information related to the scene that is being reproduced (Operation 620). When there is relevant information related to the scene, the relevant information is searched for (Operation 630). When no relevant information exists, relevant information related to the program is searched for (Operation 625). That is, the relevant information related to a particular scene that is being reproduced has a relatively higher priority while the relevant information related to the program that has no relation to the particular scene has a relatively lower priority. The priority may be set by a user who requests relevant information and individually determined at the request of relevant information.

Then, scene relevant information or program relevant information is obtained from the server (Operation 635). It is determined whether all obtained relevant information or only the relevant information created by a buddy registered in a buddy list is to be displayed, (Operation 640). Accordingly, when the 'overall relevant information' is selected as the right of access, all obtained relevant information is displayed on the screen (Operation 645). However, when the 'buddy relevant information' is selected as the right of access, the buddy list is obtained (Operation 650), only the relevant information created by buddies registered in the buddy list is displayed (Operation 655). That is, the relevant information created by users who are not buddies is not displayed on the screen. Thus, when the right of access is limited to the buddies registered by the user, the relevant information can be shared only with other users registered in the buddy list so that a user community may be formed.

Figure 7:
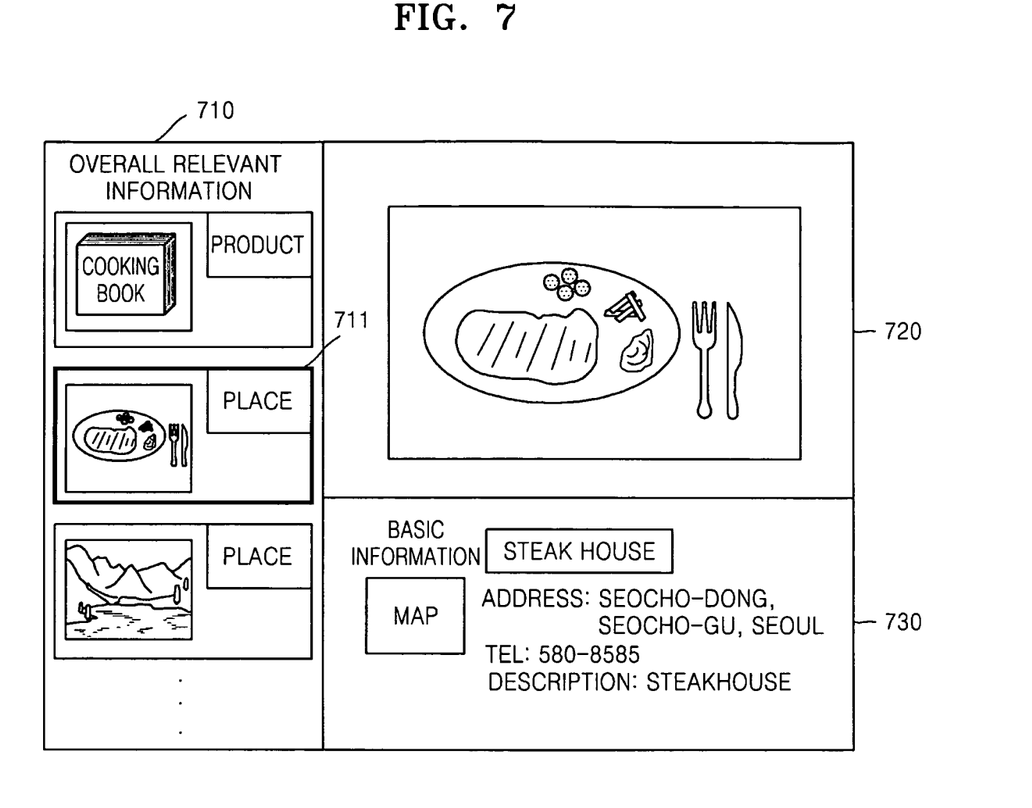
FIG. 7 illustrates the configuration of a screen providing relevant information according to another embodiment.
Figure 8:
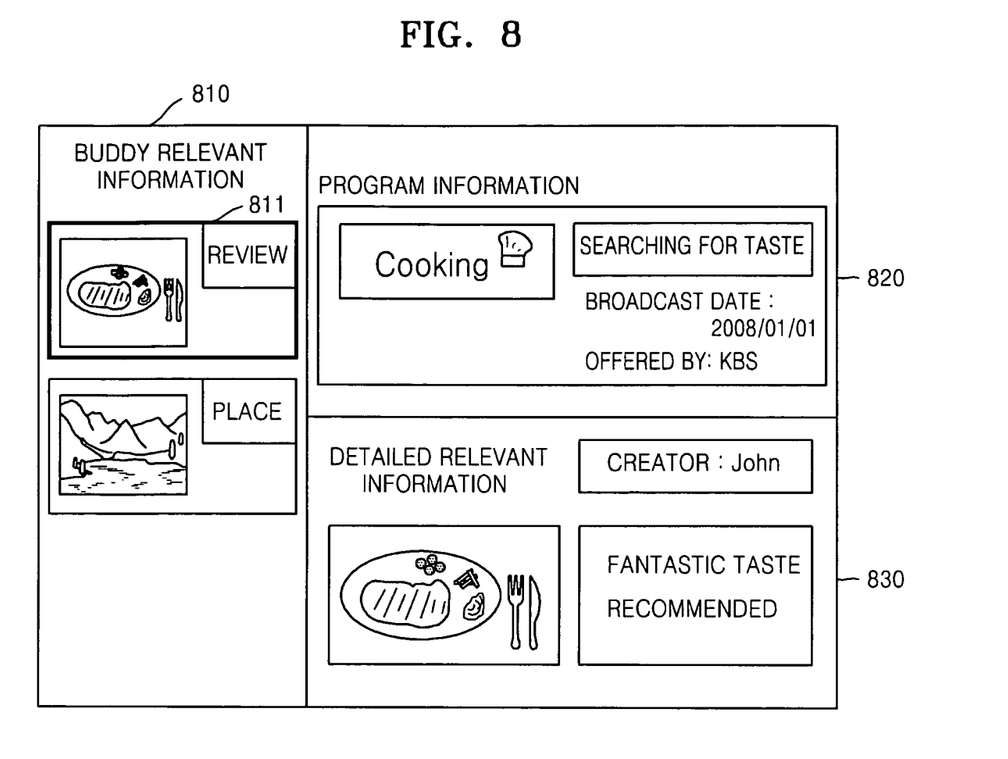
FIG. 8 illustrates the configuration of a screen providing relevant information obtained from a buddy list of a user according to another embodiment.

FIG. 7 illustrates the configuration of a screen providing relevant information according to another embodiment. FIG. 8 illustrates the configuration of a screen providing relevant information obtained from a buddy list of a user according to another embodiment. FIGS. 7 and 8 illustrate exemplary screens and a combination of other items that are not shown in FIGS. 7 and 8 may constitute the screen.

Referring to FIG. 7, the scene relevant information is obtained from the server and the right of access is the 'overall relevant information' during display. In this state, when relevant information 711 about a place is selected from an overall relevant information 710, a food image 720 corresponding to the scene is displayed with the name, address, phone number, and or the map of the restaurant selling the food, at the right side of the screen, in a basic information section 730. The relevant information is previously created by other user according to the above-described relevant information generation method and transmitted to the server.

Referring to FIG. 8, unlike FIG. 7, not all the obtained relevant information is displayed, but only relevant information 810 created by buddies registered in the user's buddy list is displayed on the screen.

Accordingly, relevant information close to one's interest may be obtained from buddies having similar interests by differing the right of access. The right of access may include everybody, buddies, and or the specific users directly set by the user.

In an exemplary screen of FIG. 8, when relevant information 811 about a program review is selected from buddy relevant information 810, brief information about the program 820 including program title, date, broadcaster etc. is displayed in a section 820. Additionally, detailed relevant information, e.g. a name of the buddy who created the relevant information 811, his/her comments etc. is displayed in a section 830. In case of displaying the buddy relevant information 810, the section 720, 730 of basic information can be displayed instead of the section 820, 830 of detailed relevant information in FIG. 8. In other words, in both of cases of displaying such that overall relevant information 710 and buddy relevant information 810, the basic information and the detailed information can be displayed selectively.

Figure 9:
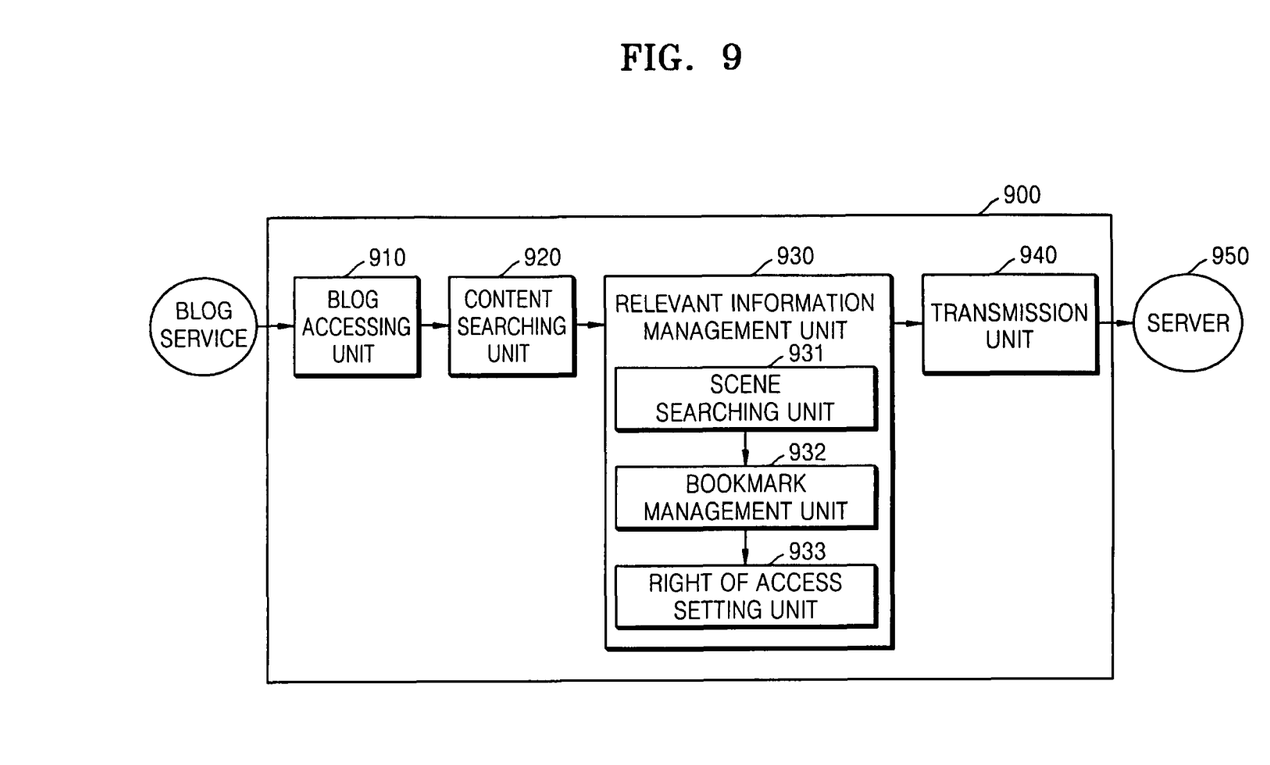
FIG. 9 is a functional block diagram of an apparatus for generating relevant information related to multimedia content according to another embodiment.

FIG. 9 is a functional block diagram of an apparatus for generating relevant information related to multimedia content according to another embodiment invention. Referring to FIG. 9, the relevant information generation apparatus of the embodiment includes a client 900 reproducing multimedia content, a blog accessing unit 910 accessing a blog service connected via Internet or wireless network, a content searching unit 920 selecting the first content of multimedia content, for which relevant information is generated, using the blog service, a relevant information management unit 930 generating the relevant information using a template according to the type of the relevant information generated with respect to the first content, and a transmission unit 940 transmitting the generated relevant information to the server.

The relevant information management unit 930 may further include a scene searching unit 931 determining whether the generated relevant information is related to the information related to the particular position in the overall section of the first content, a bookmark management unit 932 determining whether there is a bookmark information storing the position when the relevant information is related to the particular position in the overall section of the first content, and the right of access setting unit 933 setting the right of access as to whether the generated relevant information may be searched for by every other user or by only buddies later.

Figure 10:
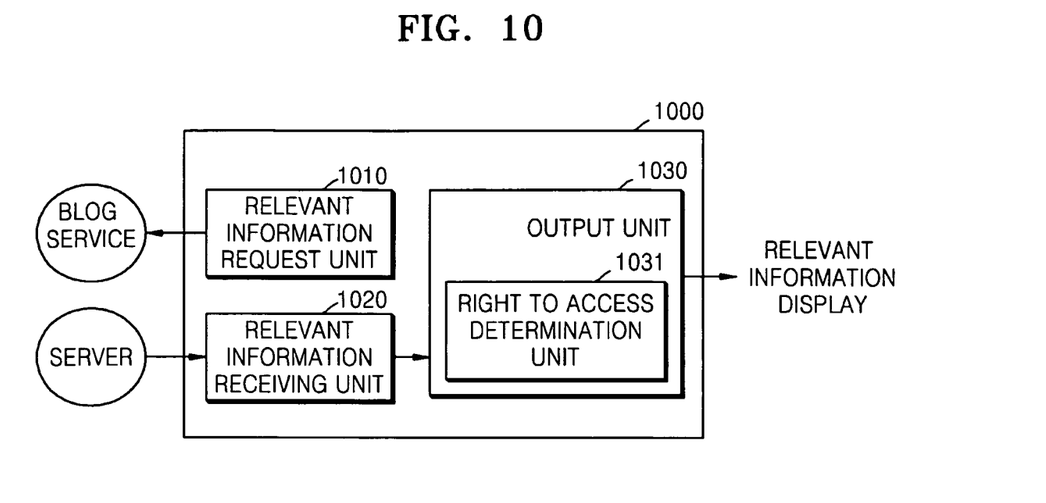
FIG. 10 is a functional block diagram of an apparatus for providing relevant information related to multimedia content according to another embodiment.

FIG. 10 is a functional block diagram of an apparatus for providing relevant information related to multimedia content according to another embodiment. Referring to FIG. 10, the apparatus for providing relevant information according to the embodiment includes a client 1000 reproducing a multimedia content, a relevant information request unit 1010 requesting relevant information related to the multimedia content that is being reproduced from a server, a relevant information receiving unit 1020 obtaining the relevant information from the server, and an output unit 1030 displaying obtained relevant information on a screen.

The relevant information receiving unit 1020 receives corresponding relevant information when relevant information related to the current scene that is currently reproduced exists in the multimedia content or receives relevant information of a program corresponding to an identifier of the multimedia content when the relevant information related to the currently reproduced scene does not exist. The output unit 1030 may further include the right of access determination unit 1031 determining which information is to be displayed based on the accessibility of the information.

According to the method and apparatus for generating and providing relevant information related to multimedia content according an embodiment, users can get plenty of additional information related to various multimedia content such as motion picture content that a user watches. Since the additional information is generated in an open social web space such as a blog, anyone who can access the web may easily add various information. Thus, compared to an existing system, a larger amount of additional information may be generated and provided. Also, since more additional information on a scene can be accumulated as time passes, a user may watch already watched content again to get new additional information. As such, the embodiment increases the exposure frequency of a content, thereby increasing advertisement profit.

The method and apparatus for generating and providing relevant information related to multimedia content according to the embodiment can be created as a computer executable program and can be represented in a general purpose digital computer operating the program using a computer readable recording medium. The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission via Internet). The computer readable recording medium can also be distributed over network coupled computer systems so that the computer readable code is stored and executed in a distributed fashion.

The embodiment invention includes a relevant information generation system which includes a client reproducing multimedia content and generating relevant information related to the multimedia content by accessing a blog service connected via Internet or wireless network, a data server storing data of the multimedia content, and a relevant information server storing the generated relevant information. Also, an aspect of the embodiment includes a relevant information providing system which includes a client requesting relevant information related to the multimedia content using the blog service connected via Internet during the reproduction of the multimedia content, a data server storing data of the multimedia content, and a relevant information server providing the requested relevant information to the client.

While this invention has been particularly shown and described with reference to exemplary embodiments thereof, it will be understood by those skilled in the art that various changes in form and details may be made therein without departing from the spirit and scope of the invention as defined by the appended claims.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of generating relevant information related to multimedia content at a client that reproduces the multimedia content, the method comprising:
reproducing the multimedia content at the client;
accessing a blog service connected to the client during the reproduction of the multimedia content;
selecting first content of the multimedia content, for which relevant information is to be generated, by using the blog service;
generating the relevant information using a template according to the type of the relevant information generated with respect to the selected first content; and
transmitting the generated relevant information to a server,
wherein the generating of the relevant information comprises determining whether the generated relevant information is related to a content reproduced at a predetermined position in an overall section of the selected first content, and
determining whether bookmark information storing the position exists when the relevant information is related to the content reproduced at a predetermined position in an overall section of the selected first content.

2. The method of claim 1, wherein the generating of the relevant information further comprises selecting a position in the overall section of the selected first content where the generated relevant information is located, when the bookmark information does not exist.

3. The method of claim 2, wherein the generating of the relevant information further comprises setting the right of access in which the generated relevant information is searched for later by other clients.

4. A method of providing relevant information related to a multimedia content at a client that reproduces the multimedia content, the method comprising:
reproducing the multimedia content at the client;
requesting the relevant information related to the multimedia content that is being reproduced, to a server, by using a blog service connected to the client via a network;
obtaining the relevant information, generated using a template according to the type of the relevant information, from the server; and
displaying the obtained relevant information on a screen;
wherein the obtaining of the relevant information comprises determining whether relevant information related to a content reproduced at a current position in the multimedia content exists in the server, and
determining whether bookmark information storing the position exists when the relevant information is related to the content reproduced at a predetermined position in an overall section of the multimedia content.

5. The method of claim 4, wherein the requesting of the relevant information comprises transmitting an identifier of a program corresponding to the requested multimedia content to the server.

6. The method of claim 5, further comprising:
searching for the relevant information when the relevant information related to a content reproduced at a current position exists; and
searching for relevant information of a program corresponding to the transmitted identifier when the relevant information related to a content reproduced at a current position does not exist, and
determining whether bookmark information storing the position exists when the relevant information is related to the content reproduced at the current position in an overall section of the content.

7. The method of claim 6, wherein the displaying of the obtained relevant information on a screen comprises determining which information is to be displayed based on the accessibility of the information.

8. The method of claim 7, further comprising obtaining a client list according to the determined accessibility of the relevant information , wherein, in the displaying of the obtained relevant information on a screen, only the relevant information created by the client belonging to the obtained list is displayed.

9. An apparatus generating relevant information related to multimedia content at a client that reproduces the multimedia content, the apparatus comprising:
a reproduction unit to reproduce the multimedia content at the client;
a blog accessing unit operated by a computer accessing a blog service connected to the client via Internet during the reproduction of the multimedia content;
a content searching unit selecting the first content of the multimedia content, for which relevant information is generated, by using the blog service;

a relevant information management unit generating the relevant information using a template according to the type of the relevant information generated with respect to the first content; and a transmission unit transmitting the generated relevant information to a server, wherein the relevant information management unit comprises a scene searching unit determining whether the generated relevant information is related to a content that is reproduced at a predetermined position in an overall section of the first content, and determining whether bookmark information storing the position exists when the relevant information is related to the content reproduced at a predetermined position in an overall section of the selected first content.

10. The apparatus of claim 9, wherein the relevant information management unit further comprises a bookmark management unit determining whether bookmark information storing the position exists when the relevant information is related to the content reproduced at a predetermined position in an overall section of the first content.

11. The apparatus of claim 10, wherein the relevant information management unit comprises a right of access setting unit setting a right of access in which the generated relevant information is searched for later by other clients.

12. An apparatus for providing relevant information related to multimedia content at a client that reproduces the multimedia content, the apparatus comprising:

a reproduction unit to reproduce the multimedia content at the client;

a relevant information request unit operated by a computer requesting the relevant information related to the multimedia content that is being reproduced, to a server, by using a blog service connected to the client;

a relevant information receiving unit obtaining the relevant information, generated using a template according to the type of the relevant information, from the server; and an output unit displaying the obtained relevant information on a screen;

wherein the relevant information receiving unit determines whether the relevant information related to a content reproduced at a current position in the multimedia content exists in the server, and determines whether bookmark information storing the position exists when the relevant information is related to the content reproduced at a predetermined position in an overall section of the multimedia content.

13. The apparatus of claim 12, wherein the relevant information receiving unit receives relevant information when the relevant information related to a content reproduced at a current position exists in the multimedia content, and receives relevant information of a program corresponding to an identifier of the multimedia content when the relevant information related to a content reproduced at a current position does not exist.

14. The apparatus of claim 13, wherein the output unit comprises the right of access determination unit determining a range of clients who create the relevant information to be displayed among the all of clients creating the obtained relevant information, and relevant information created by a client belonging to a list according to the determined client range.

15. A relevant information generation system comprising:

a client reproducing a multimedia content and generating relevant information, using a template according to the type of the relevant information, related to the multimedia content by accessing a blog service connected via Internet during the reproduction of the multimedia content; and a data server storing data of the multimedia content and a relevant information server storing the generated relevant information, wherein the generating of the relevant information comprises determining whether the generated relevant information is related to a content reproduced at a predetermined position in the multimedia content, and determining whether bookmark information storing the position exists when the relevant information is related to the content reproduced at the predetermined position in the multimedia content.

16. A relevant information providing system comprising:

a client requesting relevant information, generated using a template according to the type of the relevant information, related to a multimedia content using a blog service during the reproduction of the multimedia content and determining whether relevant information related to a content reproduced at a current position in the multimedia content exists in a server, and determining whether bookmark information storing the position exists when the relevant information is related to the content reproduced at a predetermined position in an overall section of the multimedia content; and a data server storing data of the multimedia content and a relevant information server providing the requested relevant information to the client.

17. A method of providing relevant information related to a multimedia content at a client that reproduces the multimedia content, the method comprising:

reproducing the multimedia content at the client;

requesting the relevant information related to the multimedia content that is being reproduced, to a server, by using an internet service connected to the client via a network;

obtaining the relevant information, generated using a template according to the type of the relevant information, from the server; and displaying the obtained relevant information on a screen, wherein the obtaining of the relevant information comprises determining whether relevant information related to a content reproduced at a current position in the multimedia content exists in the server, and determining whether bookmark information storing the position exists when the relevant information is related to the content reproduced at a predetermined position in an overall section of the multimedia content.

18. An apparatus for providing relevant information related to multimedia content at a client that reproduces the multimedia content, the apparatus comprising:

a reproduction unit to reproduce the multimedia content at the client;

a relevant information request unit operated by a computer requesting the relevant information related to the multimedia content that is being reproduced, to a server, by using an internet service connected to the client;

a relevant information receiving unit obtaining the relevant information, generated using a template according to the type of the relevant information, from the server; and an output unit displaying the obtained relevant information on a screen, wherein the relevant information receiving unit determines whether the relevant information related to a content reproduced at a current position in the multimedia content exists in the server, and determines whether bookmark information storing the position exists when the relevant information is related to the content reproduced at a predetermined position in an overall section of the multimedia content.

* * * * *

UNITED STATES PATENT AND TRADEMARK OFFICE
CERTIFICATE OF CORRECTION

| | | |
|---|---|---|
| PATENT NO. | : 8,661,013 B2 | Page 1 of 1 |
| APPLICATION NO. | : 12/320744 | |
| DATED | : March 25, 2014 | |
| INVENTOR(S) | : Choi et al. | |

It is certified that error appears in the above-identified patent and that said Letters Patent is hereby corrected as shown below:

In the Claims

Column 10, Line 53, In Claim 8, delete "information ," and insert -- information, --, therefor.

Signed and Sealed this
First Day of July, 2014

Michelle K. Lee
*Deputy Director of the United States Patent and Trademark Office*